(12) United States Patent
Liu et al.

(10) Patent No.: US 8,099,382 B2
(45) Date of Patent: Jan. 17, 2012

(54) METHOD AND SYSTEM FOR MAPPING MULTI-DIMENSIONAL MODEL TO DATA WAREHOUSE SCHEMA

(75) Inventors: Sheng Ping Liu, Beijing (CN); Zhao Ming Qiu, Beijing (CN); Guo Tong Xie, Xi Er Qi (CN); Yang Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 12/100,749

(22) Filed: Apr. 10, 2008

(65) Prior Publication Data

US 2008/0256121 A1 Oct. 16, 2008

(30) Foreign Application Priority Data

Apr. 13, 2007 (CN) .......................... 2007 1 00 96351

(51) Int. Cl.
*G06F 7/00* (2006.01)
*G06F 17/00* (2006.01)
(52) U.S. Cl. ...................................... 707/601
(58) Field of Classification Search .................. 707/601, 707/999.102
See application file for complete search history.

(56) References Cited

U.S. PATENT DOCUMENTS

| | | | | |
|---|---|---|---|---|
| 6,161,103 | A * | 12/2000 | Rauer et al. ........................ | 1/1 |
| 7,149,746 | B2 * | 12/2006 | Fagin et al. .................... | 707/756 |
| 2006/0031823 | A1 * | 2/2006 | Vasilevskiy et al. .......... | 717/144 |
| 2006/0136463 | A1 * | 6/2006 | Nash et al. .................... | 707/102 |

OTHER PUBLICATIONS

Zhu et al., "Data Transformation for Warehousing Web Data," IEEE, Aug. 7, 2002, 74-85.*

Urban, S.D., Tjahjadi, M., Shah, J.J., "A Case Study in Mapping Conceptual Designs to Object-Relational Schemas," Concurrency: Practice and Experience, Concurrency: Pract. Exper. 2000; 12:863-907; Copyright 2000 John Wiley & Sons, Ltd.
Eshuis, R., Brimont, P., Dubois, E., Gregoire, B., Ramel, S., "Animating ebXML Transactions with a Workflow Engine", Centre de Recherche Public Henri Tudor, 29, Avenue John F. Kennedy, L-1855, Luxembourg-Kirchberg, Luxembourg.
Zhu, Y., Bornhovd, C., Buchmann, A.P., "Data Transformation for Warehousing Web Data," Department of Computer Science, Darmstadt University of Technology 64283 Darmstadt, Germany, Aug. 7, 2002.

* cited by examiner

*Primary Examiner* — John E Breene
*Assistant Examiner* — Aleksandr Kerzhner
(74) *Attorney, Agent, or Firm* — Jose Gutman; Fleit Gibbons Gutman Bongini & Bianco PL

(57) ABSTRACT

A system maps a multidimensional model to data warehouse schema. The system includes a multidimensional model editor for defining a multidimensional model based on a conceptual model; a mapping reasoner for generating more simple mappings from basic mappings by reasoning on the conceptual model so as to provide mappings for concerning elements in an ontology path in the multidimensional model; a data warehouse schema analyzer for generating a data structure capable of indicating information of the data warehouse schema by making an analysis on the information of the data warehouse schema; and a mapping composition engine for generating result mappings according to mappings for the concerning elements of the ontology path in the multidimensional model and by searching in the data structure paths corresponding to the concerning elements of the ontology path in the multidimensional model. A method and computer program product are also disclosed.

14 Claims, 8 Drawing Sheets

METHOD AND SYSTEM FOR MAPPING MULTI-DIMENSIONAL MODEL TO DATA WAREHOUSE SCHEMA

CROSS-REFERENCE TO RELATED APPLICATIONS

This application is based upon and claims priority from a prior Chinese Patent Application No. 200710096351.7 filed on Apr. 13, 2007, the entire disclosure of which is herein incorporated by reference in its entirety.

FIELD OF THE INVENTION

The present invention generally relates to information processing, and in particular, to a method and system for mapping multidimensional model to data warehouse schema.

BACKGROUND OF THE INVENTION

The successful operation and use of data warehouses heavily depends on the effective management of a multitude of metadata. In a data warehouse system, there are two types of users: technical users and business users. Technical users such as data warehouse administrators are mainly interested in metadata in the technical implementation aspect, while business users, who are not familiar with technologies such as data structured query language (SQL), are interested in understanding the business meaning of data, and therefore need business-oriented representations of the structure and contents of data in data warehouse. So, the metadata in data warehouse can be divided into two categories based on target users for the metadata, comprising:

Business Metadata: Business metadata intend to provide a business-oriented description of the data and processes. In a data warehouse environment, the important business metadata include: Business Concept Model, i.e. a concept model that is used for organizing business knowledge in a semantic way and that represents how to run businesses via relationships among business concepts, concept attributes and concepts; Multidimensional Model, i.e. a concept model that is used for defining complete requirement for business intelligence (BI) application and that represents how to measure businesses in terms of measures, dimensions and the hierarchies of dimensions.

Technical Metadata: Technical metadata provide the description of data within an IT infrastructure, for instance, locations of data, names of data, method for accessing to servers, data storage types, and other attributes. Some example technical metadata are the schema of data warehouse, the schema of operational data sources.

The schematic mapping from the business metadata to IT metadata is the key to design a business-friendly data warehouse. This mapping can advantageously support the implementation of: business-oriented navigation of the data collected in the data warehouse or the data marts; ad-hoc querying at the level of business concepts without having to know the technical details on query languages (such as SQL); the automatic deployment of data mart based on the on-line analytical processing (OLAP) requirement represented by the business metadata.

In the prior art, a multidimensional model is defined by business users from the perspective of businesses, and a data warehouse schema is developed by one or more groups of technical users, and the mapping from the multidimensional model to the data warehouse (DW) schema (star-schema), i.e. the mapping from the path expression of multidimensional model to the path expression of data warehouse schema has to be created manually. Here, a path expression includes a direct property of the concerning class and an indirect property connecting two classes through a chain of properties.

The creation of mapping from a path expression of multi-dimensional model to a path expression of data warehouse schema is a very complex, time-consuming and error-prone task, since measures and dimensions in the multidimensional model are always correlated and their semantics is implicit to the data warehouse schema. In addition, the mappings that were created previously are difficult to be reused for similar dimensions. For example, if there are three dimensions, namely policy holder's education level, policy holder's income and insurance participant's income, in a claim analysis of an insurance company, the mappings for a dimension is difficult to be reused for any other dimension because there are no separate mappings for the concepts "policy holder" and "insurance participant" and no separate mappings for the property "income."

Apparently, the creation of the mapping from multidimensional model to data warehouse schema by means of the existing solutions is very complex and specialists who are familiar with both a business and an IT infrastructure, is required to conduct a large amount of work in order to complete the creation accurately. Business users can hardly create various mappings as their demands in a specific application independently and conveniently and ensure certain accuracy at the same time. As a result, the efficiency of management and utilization of the data warehouse is degraded dramatically.

SUMMARY OF THE INVENTION

To solve the problems in the prior art, the present invention proposes a solution that can reduce the complexity of mapping from multidimensional model to data warehouse schema to a great extent and assist users in creating complex mapping from the path expression of multi-dimensional model to the path expression of data warehouse schema. This is especially advantageous to business users.

According to a first aspect of the present invention, a system for mapping multidimensional model to data warehouse schema is provided. The system comprises: a multidimensional model editor for defining a multidimensional model based on a conceptual model; a mapping reasoner for generating more simple mappings from basic mappings by reasoning on the conceptual model so as to provide mappings for concerning elements in an ontology path in the multidimensional model; a data warehouse schema analyzer for generating a data structure capable of indicating information of the data warehouse schema by making an analysis on the information of the data warehouse schema; and a mapping composition engine for generating result mappings according to mappings for the concerning elements of the ontology path in the multidimensional model and by searching in the data structure paths corresponding to the concerning elements of the ontology path in the multidimensional model.

According to a second aspect of the present invention, a method for mapping multidimensional model to data warehouse schema is provided. The method comprises the steps of: defining a multidimensional model based on a conceptual model; generating more simple mappings from basic mappings by reasoning on the conceptual model so as to provide mappings for concerning elements in an ontology path in the multidimensional model; generating a data structure capable of indicating information of the data warehouse schema by making an analysis on the information of the data warehouse schema; and generating result mappings according to mappings for the concerning elements of the ontology path in the multidimensional model and by searching in the data structure paths corresponding to the concerning elements of the ontology path in the multidimensional model.

According to a third aspect of the present invention, provided is a computer program product for implementing the method according to the present invention when being executed by a computer device.

With the present invention, the existing basic mappings can be reused for different ontology paths. With the reusing of the existing basic mappings, the present invention assists the user to built complex mappings from multidimensional model to data warehouse schema more conveniently and effectively. Moreover, the probability of error occurrence in building complex mapping from composite ontology path to data warehouse schema is reduced by providing result mappings and allowing users to select and refine result mappings in the friendly interface.

Other features and advantages of the present invention will become more apparent from the following detailed description, when taken in conjunction with the accompanying drawings.

BRIEF DESCRIPTION OF THE DRAWINGS

Reference will be made to the following accompanying drawings to explain in detail features and advantages of embodiments of the present invention. If possible, like or similar reference numerals designate the same or similar components throughout the figures thereof and description, in which.

DETAILED DESCRIPTION

Figure 1:
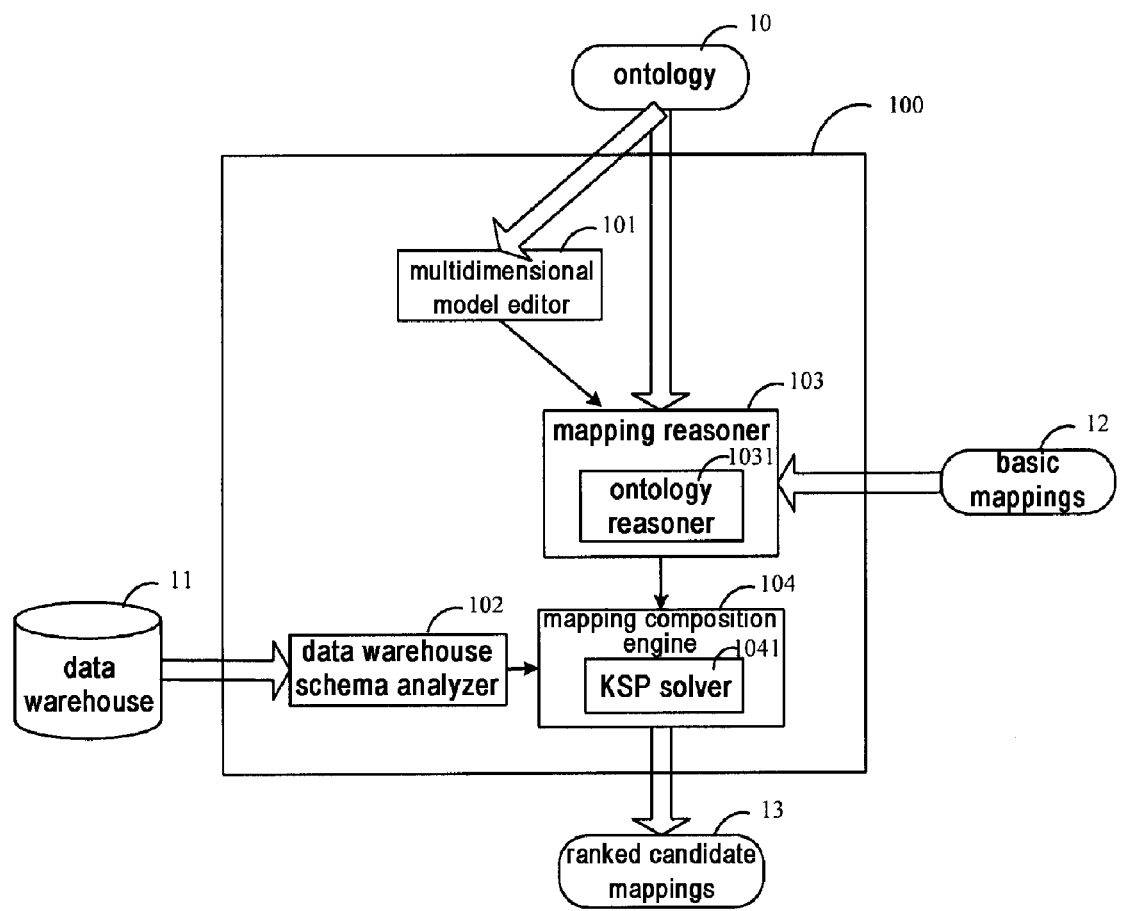
FIG. 1 depicts a system for mapping multidimensional model to data warehouse schema according to an embodiment of the present invention.

FIG. 1 schematically depicts a system for mapping multidimensional model to data warehouse schema according to an embodiment of the present invention.

As depicted in FIG. 1, reference numeral 100 denotes a system for mapping multidimensional model to data warehouse schema according to an embodiment of the present invention. The system consists of four main components, wherein reference numeral 101 denotes a multidimensional model editor, 102 a data warehouse schema analyzer, 103 a mapping reasoner, and 104 a mapping composition engine. FIG. 1 further depicts an ontology 10, a data warehouse 11, basic mappings 12, which serve as data information inputs of system 100, and result mappings 13, which serve as output information of system 100.

According to an embodiment of the present invention, a user uses multidimensional model editor 101 to define a multidimensional model conforming to specific business analysis requirement, wherein the multidimensional model is defined according to a conceptual model represented by ontology 10. For example, ontology 10 presents in Web ontology language. Inputs to mapping reasoner 103 include multidimensional models from multidimensional model editor 101, ontology 10 and basic mappings 12. Basic mappings 12 include mappings from each element (concept, relationship, property) in the conceptual model represented by ontology 10 to the data warehouse schema, and basic mappings 12 are known (pre-established) information. Mapping reasoner 103 may further generate more simple mappings by reasoning on the concept model. Preferably, mapping reasoner 103 can invoke an ontology reasoner 1031 to perform the reasoning. Data warehouse schema analyzer 102 performs an analysis of schema information of data warehouse 11, produces a data structure capable of indicating schema information of the data warehouse, and outputs the data structure to mapping composition engine 104. Mapping composition engine 104 searches in the data structure capable of indicating schema information of the data warehouse paths corresponding concerning ontology elements and then generates result mappings from composite ontology path to data warehouse scheme. Preferably, mapping composition engine 104 can perform a shortest path searching on the data structure indicating schema information of the data warehouse by means of a KSP solver 1041. Further, mapping composition engine 104 can preferably rank generated result mappings and output a list of ranked result mappings. In this manner, the user can select or refine desired mappings from ontology path to data warehouse schema based on the list of result mappings output by system 100.

The operating principle of system 100 will be set forth in detail.

Multidimensional model editor 101 is used by a user to define a multidimensional model. As described previously, the multidimensional model defines complete requirement for business intelligence (BI) application and represents how the business is measured in terms of measures, dimensions and the hierarchies of dimensions. The multidimensional model defined by multidimensional model editor 101 according to the present application is characterized in that it is defined completely by business terms in the conceptual model represented by ontology 10. In an implementation, since the conceptual model is represented by ontology 10 in terms of OWL language, the core of the multidimensional model definition language in multidimensional model editor 101 is an extension of OWL language with ontology path expressions. In a broad sense, an ontology path expression can be just one single class or property, i.e. basic ontology path expression; or a chain of multiple properties, i.e. composite ontology path expression. The composite ontology path expression is used to denote relationship from one class to another class or data range.

The definition of an ontology path in multidimensional model editor 101 will be shown in the BNF format hereinafter. The operator "." is used to denote the traversal from one class to another class via an objectProperty, and the access of a datatypeProperty. As the object property can be applied to multiple classes, the DomainClass and RangeClass are the applied class for the property.

```
OntPathExpr ::=
         Class |
         datatypeProperty |
         objectProperty |
            DomainClass'.'objectProperty['['
RangeClass']'] |
         DomainClass '.'datatypeProperty |
         OntPathExpr'.'objectProprety['[' RangeClass
']'] |
                  OntPathExpr'.' daytypeProperty
   objectProperty ::= R |
                  '^'R
   R::=   object property name in ontology
   dataypeProperty::= datatype property name in ontology
   DomainClass   ::= class name in ontology
   RangeClass    ::= class name in ontology
   Class         ::= class name in ontology
```

Figure 2:
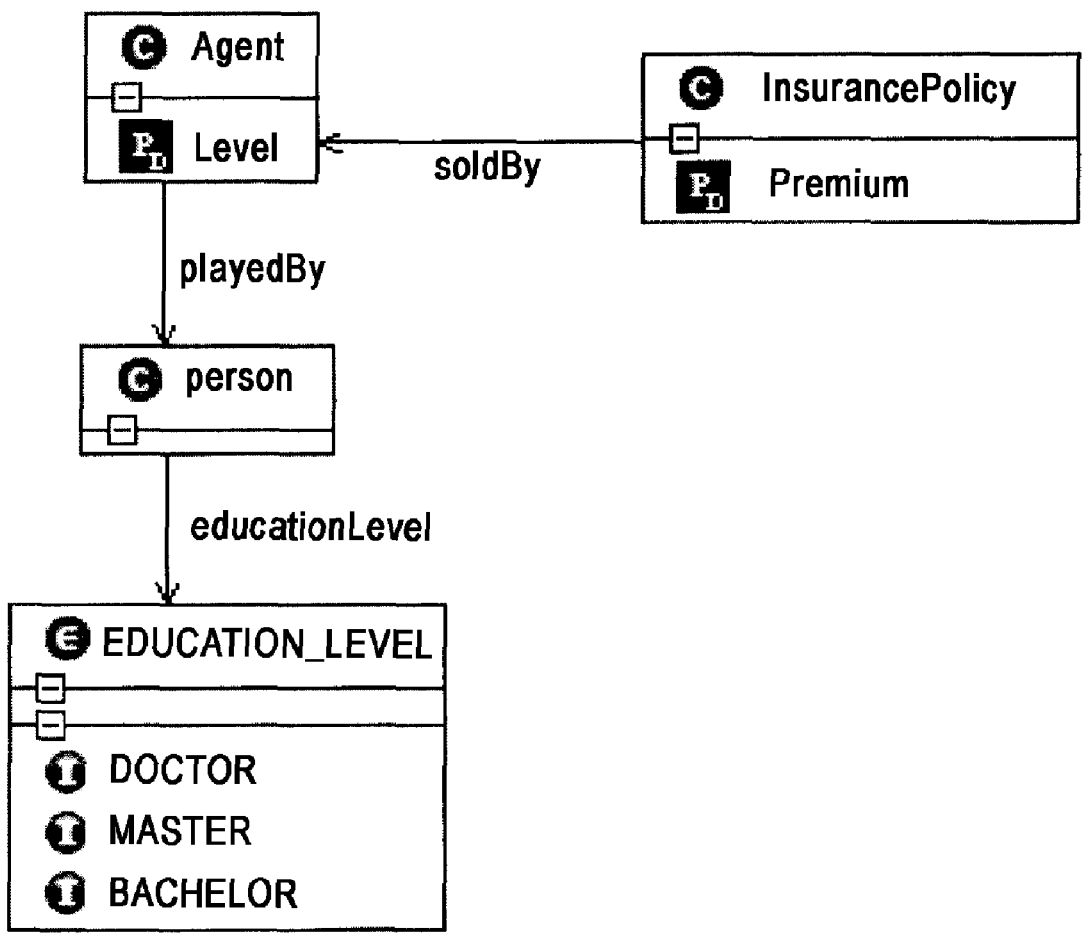
FIG. 2 schematically depicts an example of a conceptual model represented by ontology language.

For example, according to the conceptual model (represented by OWL) depicted in FIG. 2, a multidimensional model might be defined for a simple premium analysis in multidimensional model editor 101 in order to review the relationships among the agent's level, education level and selling premium:

Measure: received premium

Dimension: selling agent's level, selling agent's education level

These measures and dimensions may be represented by the composite ontology path expression starting from the "InsurancePolicy" class:

Received premium::=InsurancePolicy.premium

Selling agent's level::=InsurancePolicy.soldBy[Agent].level

Selling agent's education level::=InsurancePolicy.soldBy[Agent].playedBy[Person].educationLevel Since the user defines a multidimensional model according to the conceptual model (ontology) in the present invention, it can be appreciated that the core of the mapping from multi-dimensional model to DW schema is the mapping from ontology path expression to data warehouse schema. The source of a mapping rule is the ontology path expression, and the target of a mapping rule is data warehouse schema path expression, such as relational database (RDB) path expression of data warehouse 11.

Like the ontology path expression, in the RDB path expression, tables correspond to the classes in ontology, and foreign keys correspond to the object properties in ontology, and columns correspond to the data type properties. It should be noted that one foreign key in RDB connects only one target table, which is different from the RangeClass in ontology.

The definition of the RDB path will be shown in the BNF format hereinafter.

```
RDBPathExpr ::=
         Table'.'Rlsp |
         Table'.' column |
         RDBPathExpr '.' Rlsp |
         RDBPathExpr '.' column
   Rlsp ::= FK |
         '^'FK|
         '('Table'.' column compOp Table'.'column')'
   Table    ::= table name in RDB schema
   column   ::= column name in RDB schema
   FK       ::= foreign key column name in RDB schema
   compOp ::= '=' | '<=' | '<' | '>=' | '>'
```

Figure 3:
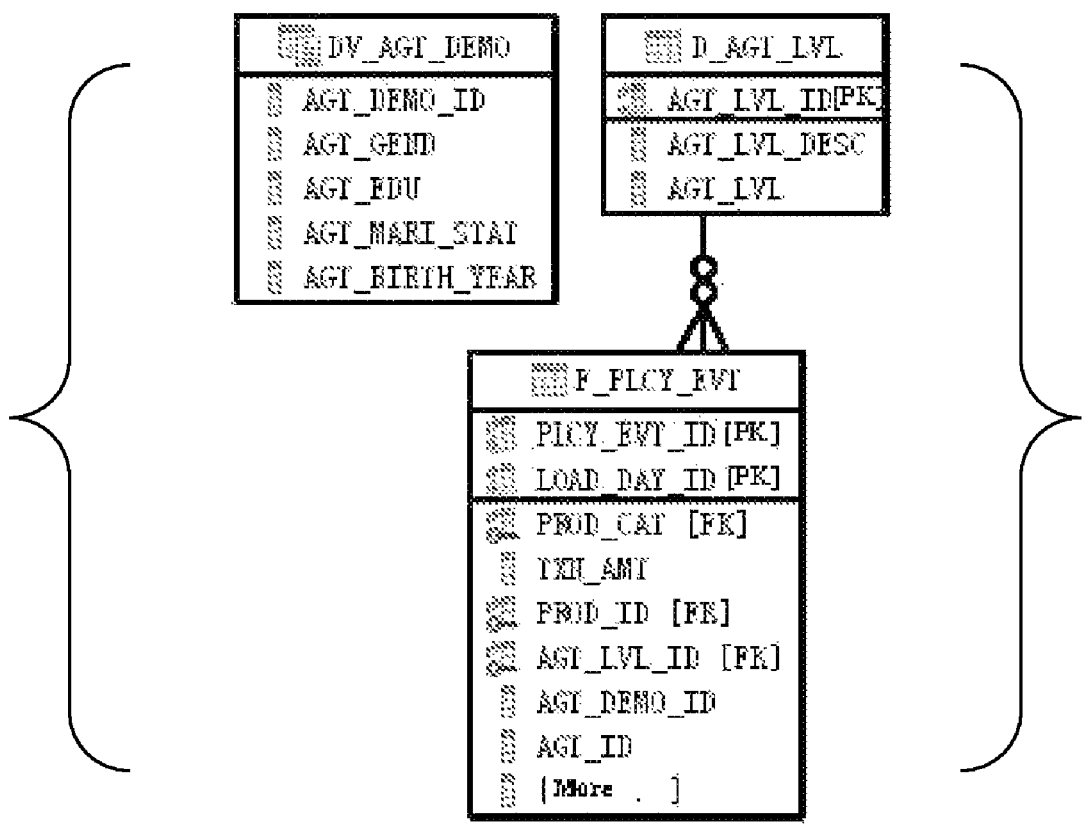
FIG. 3 schematically depicts an example of a structure of a data warehouse.

For example, data warehouse 11 stores relational data as depicted in FIG. 3. FIG. 3 depicts three tables. Table 301, named DV_AGT_DEMO, includes AGT_DEMO_ID and other columns; table 302, named D_AGT_LVL, includes AGT_LVL_ID, AGT_LVL_DESC and other columns, among which AGT_LVL_ID is a primary key (PK); table 303, named F_PLCY_EVT, includes PLCY_EVT_ID, LOAD_DAY_ID, PROD_CAT and other columns, among which PLCY_EVT_ID and LOAD_DAY_ID are primary keys (PK) and PROD_CAT, PROD_ID and AGT_LVI_ID are foreign keys. For example, the RDB paths in FIG. 3 include:

```
      F_PLCY_EVT.AGT_LVL_ID.AGT_LVL
      F_PLCY_EVT.(F_PLCY_
   EVT.AGT_DEMO_ID=D_AGT_DEMO.
   AGT_DEMO_ID).AGT_EDU
```

In the present invention, the mapping from multidimensional model based on the conceptual model to DW schema corresponds to a set of mapping rules with 4-ary tuples as <Source, Target, Condition, Translation>. According to the present invention, the "Source" is the ontology path expression; the "Target" is the RDB path expression; the "Condition" is the definition of under what condition for the target the mapping is correct, which corresponds to the WHERE clause in SQL; and the "Translation" is the value translation function that translates the values for ontology property to the data values for column in RDB schema.

The syntax for a mapping rule will be shown in the BNF format hereinafter.

```
   MappingRule   ::=   ruleID':'  src_path   ':-' tgt_path
['Condition:'condition] ['Translation:{' translation'}']
      src_path       ::= OntPathExpr
      tgt_path       ::= RDBPathExpr
      condition      ::=SQLCondition
      translation    ::=         {translationPair';'}
   translationPair
      translationPair ::= constant '=' constant
      constant       ::= uri|literal
      uri            ::= URI reference
      ruleID         ::= String
```

Since the ontology path expressions includes basic ontology expressions, namely individual classes or properties, and composite ontology path expressions, namely indirect properties each representing a chain of multiple properties, the mapping rules employed in the present invention can be divided into two categories: basic mapping and composite mapping.

In the basic mapping, the source is individual class, object property or datatype property. According to an embodiment of the present invention, since the multidimensional model is created according to the conceptual model represented as ontology, technical users may create the mapping from each element (including class, object property, datatype property) in ontology to DW schema in advance (for example, during the stage of system development). In the embodiment depicted in FIG. 1, basic mappings 12 are established in advance and serving as one of data inputs to mapping reasoner 103.

In the composite mapping, the source is a composite ontology path expression other than individual class, object property or datatype property. According to an embodiment of the present invention, the mapping from the composite ontology path expression to DW schema is achieved by means of mapping composition engine 104 searching in the data structure representing information of data warehouse schema paths corresponding to concerning ontology elements and then generating a result mapping from the composite ontology path to data warehouse schema.

In order to generate candidate mappings in mapping composition engine 104, two information inputs are required, namely an input representing information of ontology paths and an input representing data structure indicating schema information of DW. To begin with, a description will be given to these two information inputs.

The input representing information of ontology paths are provided by mapping reasoner 103. Mapping reasoner 103 generates more simple mappings from basic mappings by reasoning on the conceptual model. For example, the reasoning rules may include:

A class inherits all the mappings of its subclasses, i.e.

$$M(C)=M(C) \cup \{M(C_i)|C_i \subseteq C\}.$$

A property inherits all the mappings of its sub-properties, i.e.

$$M(p)=M(p) \cup \{M(p_i)|p_i \subseteq p\}.$$

Wherein M denotes mapping operation, C denotes "class", and p denotes "property".

The reasoning services to get all the subclasses of a class and all the sub-properties of a property are provided by an internal ontology reasoner (ontology reasoner 1031 as depicted in FIG. 1) of system 100 or an external ontology reasoner (not depicted).

The data structure representing the schema information of DW is provided by data warehouse schema analyzer 102. Data warehouse schema analyzer 102 analyzes the schema information of data warehouse 11 and generates a data structure capable of indicating the schema information of the data warehouse. The data structure capable of indicating the schema information of the data warehouse may be a functional dependency (FD) graph. If data warehouse 11 is 3-NF, the functional dependency information generated by data warehouse schema analyzer 102 is trivial, i.e. all non-primary key columns are dependent on the primary key (PK) column. But if DW schema 11 is not 3-NF, the functional dependency information that cannot be derived from the table needs to be inputted in advance. Similar to the basic mapping, the functional dependency relation among non-primary keys in the data warehouse is known information established in advance and serving as an input to data warehouse schema analyzer 102 (not separately depicted in FIG. 1).

Assume that each table in data warehouse 11 has a column as primary key, the Functional Dependency may be represented in the form of:

X→Y, where X can be a column, and Y can be a set of columns.

The Functional Dependency between two different tables can be joined by the foreign key relationship between tables, i.e., X→Y, Y'→Z, and <Y,Y'> is the <FK, PK> pair, then X→Z, For a relational database, the nodes of the corresponding functional dependency graph are the columns in one table, the edges denote the functional dependency relationship or a join between a <FK, PK> pair. Preferably, if the edge type in the functional dependency graph is of join, then the weight is 1, otherwise it is 0. So, the functional dependency graph in data warehouse schema analyzer 102 is a weighted and directed graph. The functional dependency graph may contain cycles if a relational database has a foreign key directed to itself.

Figure 4:
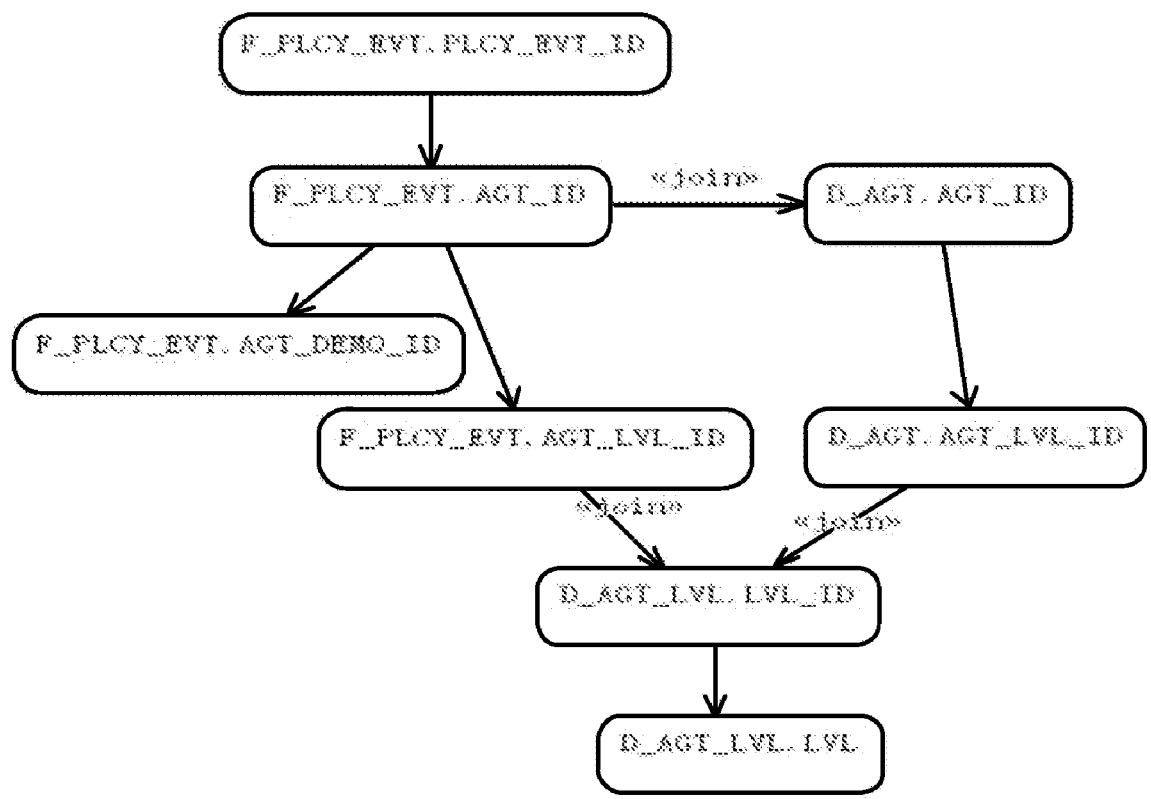
FIG. 4 schematically depicts an example of a functional dependency graph.

As an example, a sub-graph for the functional dependency information in table 303 depicted in FIG. 3 is as depicted in FIG. 4.

Mapping composition engine 104 searches in the data structure representing schema information of the data warehouse paths corresponding to ontology elements and then generates the result mapping from the composite ontology path to data warehouse schema. Specifically, the inputs to mapping composition engine 104 include an ontology path expression C1.P1[C2] . . . Pn-1[Cn].Pa, known mappings inputted from mapping reasoner 103 (including basic mappings and reasoned simple mappings). According to an implementation of the present invention, the mappings M(C1) for C1 and M(Pa) for attribute Pa may be inputted for example. The inputs to mapping composition engine 104 further include the functional dependency graph G inputted from data warehouse schema analyzer 102. As described previously, mapping composition engine 104 may further perform a shortest path searching on the data structure indicating the schema information of a data warehouse by means of a KSP solver 1041. So the inputs to mapping composition engine 104 may further include a maximally returned number of result mappings for ranking.

Figure 5:
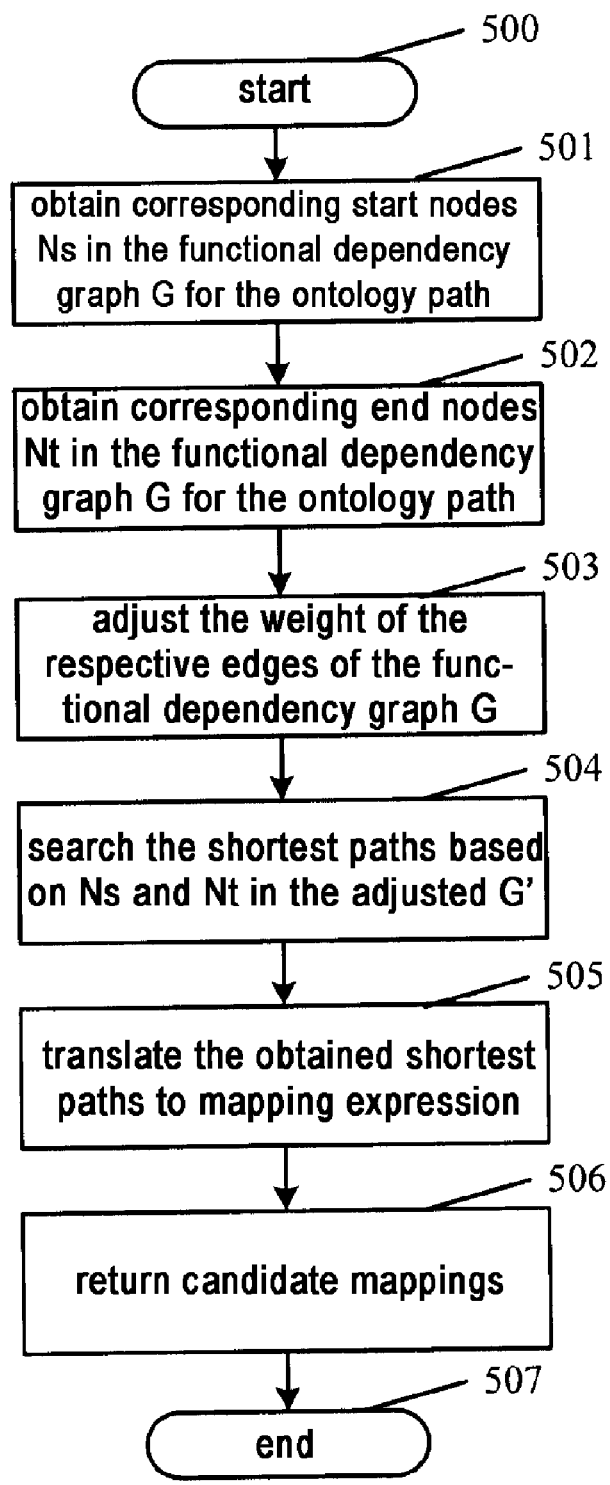
FIG. 5 depicts a processing flowchart adopted by a mapping composition engine for generating composite mapping according to an embodiment of the present invention.

FIG. 5 depicts a processing flowchart adopted by a mapping composition engine for generating composite mapping according to an embodiment of the present invention.

The processing starts with step S500.

In step S501, a corresponding start node(s) Ns of the ontology path C1.P1[C2] . . . Pn-1[Cn].Pa in the functional dependency graph G is obtained, i.e. the mapped foreign key(s) for C1 is obtained and corresponding node(s) thereof in the functional dependency graph G is found. Ns in the functional dependency graph of the data warehouse can correspond to a plurality of nodes.

Take the following example into consideration. Through reasoning of mapping reasoner 103, mapping composition engine 104 obtains the following mapping information as inputs:

Agent:—F_PLCY_EVT.AGT_ID[D_AGT]

level:—D_AGT_LVL.AGT_LVL

And through analysis of data warehouse schema analyzer 102, mapping composition engine 104 obtains a functional dependency graph as depicted in FIG. 4. Then, with respect to the composite ontology path: "Agent.level," the corresponding node obtained in this step and for the mapped foreign key(s) of "Agent" are:

Ns={F_PLCY_EVT.AGT_ID}

In step S502, a corresponding end node(s) Nt of the ontology path C1.P1[C2] . . . Pn-1[Cn].Pa in the functional dependency graph G is obtained, i.e. the mapped column(s) for Pa is obtained and a corresponding node(s) thereof in the functional dependency graph G is found. Nt in the functional dependency graph of the data warehouse can correspond to a plurality of nodes.

In the above example, for example, the obtained corresponding node for the mapped column for "level" is:

Nt={D_AGT_LVL.AGT_LVL}

Preferably, in step S503, the weight of each edge of the functional dependency graph G is adjusted to get G'. For example, the corresponding edges in G for the mapping M(P1), . . . M(Pn) may be found, and the weight of these edges is adjusted to 0.3. In this manner, the highest priority of the K-Shortest Path algorithm will be given to corresponding nodes for classes and properties in the ontology path expression in searching shortest paths.

In step S504, a maximally returned number (i.e. K) of shortest paths are found in G' based on Ns and Nt. Specifically, if each of Ns and Nt is a set of nodes, then a maximally returned number, i.e. K, of shortest paths are found in G' for each node s in Ns and for each node t in Nt. This step may be performed by invoking a shortest path solver inside the system (e.g. KSP solver 1041 depicted in FIG. 1) or a shortest path solver outside the system (not depicted). The shortest path solver searches K shortest paths in a directed graph with non-negative weight by means of any known algorithms, such as the double-sweep algorithm and the generalized Floyd algorithm.

Figure 6:
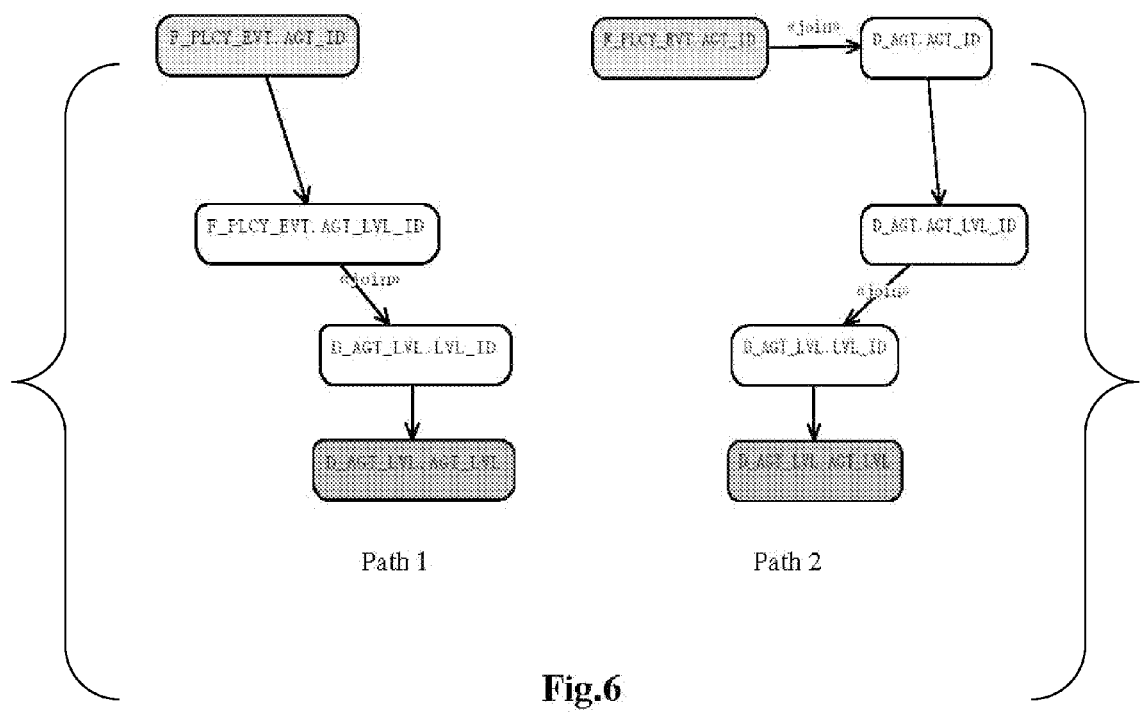
FIG. 6 schematically depicts a shortest path found in the functional dependency graph.

In the above example, for example, the shortest paths found in the functional dependency graph are as depicted in FIG. 6.

In step S505, the obtained K shortest paths in the functional dependency graph are translated into mapping expressions. The mapping is built by connecting the table by the "join" edge, and ignoring the edges with weight as "0", except of the last edge for reaching Nt.

In step S506, the result mappings M(P) are returned.

In the above sample, for example, the result mappings provided to the user may be:

Path1: Agent.level
:–F_PLCY_EVT.AGT_LVL_ID[D_AGT_LVL].
  AGT_LVL
Path2: Agent.level
:–F_PLCY_EVT.AGT_ID[D_AGT].AGT_LVL_ID
  [D_AGT_LVL].AGT_LVL The processing ends with step S507.

Preferably, mapping composition engine 104 may rank the obtained result mappings so as to be selected by the users. According to an implementation of the present invention, the obtained result mappings may be ranked according to the following expression:

$$\text{Rank}(p) = \text{weight}(p) + \alpha \times (1 - |S_m \cap S_p|/|S_m|), 0 < \alpha < 1$$

Wherein p is the obtained shorted path, $S_m$ is the set of nodes in the functional dependency graph corresponding to the class and properties other than the start class (C1) and end property, and $S_p$ is the set of the nodes which the path p covers.

The less the calculated value of Rank (p), the higher the relevance between the mapping and the ontology path.

Of course, those having ordinary skill in the art may use any approaches to rank the result mappings as their concrete demands.

Figure 7:
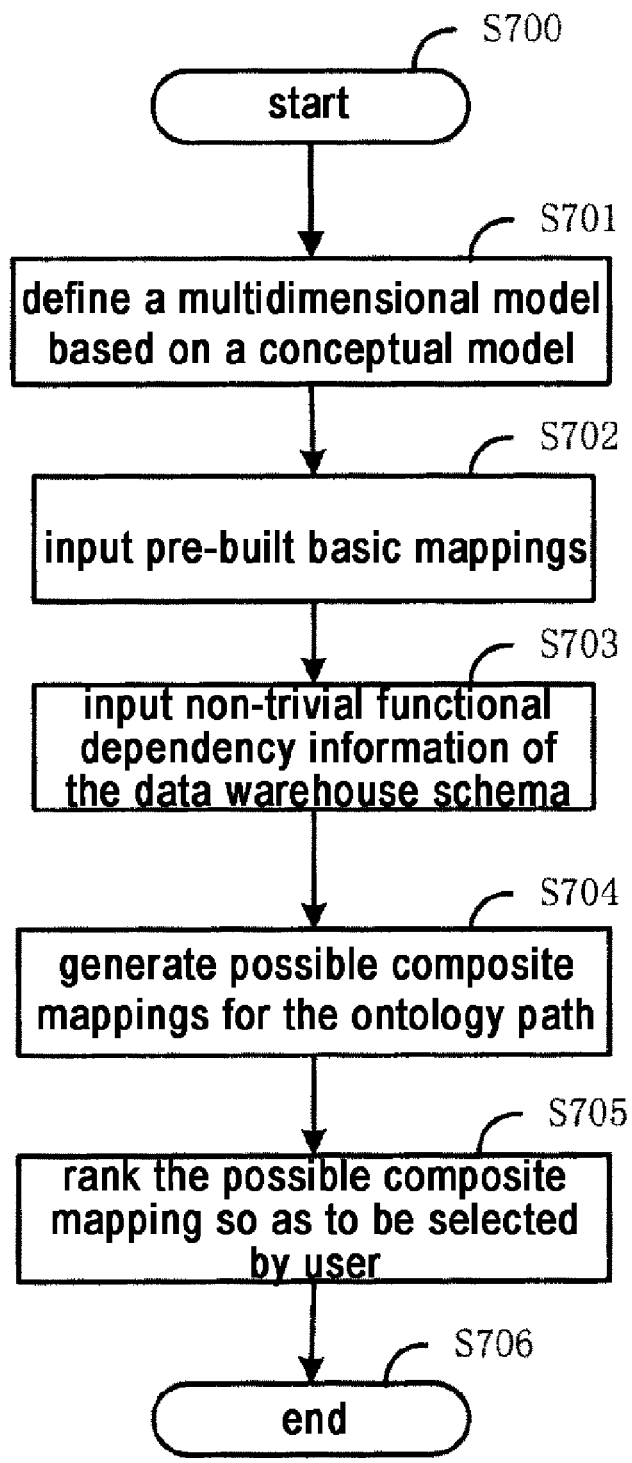
FIG. 7 depicts a processing flowchart of a method for mapping multidimensional model to data warehouse schema according to an embodiment of the present invention.

FIG. 7 depicts a processing flowchart of a method for mapping multidimensional model to data warehouse schema according to an embodiment of the present invention.

The processing starts with step S700.

In step S701, a multidimensional model conforming to specific business analysis requirements is defined based on a conceptual model represented for example by ontology. A user may select the ontology path in a well-built multidimensional model as the source for mapping via a graphical user interface.

In step S702, basic mappings that are established in advance are inputted. The basic mappings are mappings from each element in the conceptual model to data warehouse schema. Preferably, simple reasoning may be performed on the basis of basic mappings in order to get more simple mappings.

In step S703, a data structure capable of indicating schema information of the data warehouse is generated and inputted. The data structure may be a functional dependency graph denoting functional dependency information of the data warehouse, for example.

In step S704, possible result mappings are generated for the composite ontology path by searching in the data structure indicating the schema information of the data warehouse paths corresponding to ontology elements. According to an implementation of the present invention, a searching of shortest paths in the functional dependency graph may be performed in order to generate possible result mappings.

Preferably, in step S705, the obtained result mappings are ranked so as to be selected by the users. According to an implementation of the present invention, the obtained result mappings may be ranked according to the following expression:

$$\text{Rank}(p) = \text{weight}(p) + \alpha \times (1 - |S_m \cap S_p|/|S_m|), 0 < \alpha < 1$$

Wherein p is the obtained shorted path, $S_m$ is the set of nodes in the functional dependency graph corresponding to the class and properties other than the start class (C1) and end property, and $S_p$ is the set of the nodes which the path p covers.

The less the calculated value of Rank (p), the higher the relevance between the mapping and the ontology path.

Of course, those having ordinary skill in the art may use any approaches to rank the result mappings as their concrete demands.

The processing ends with step S706.

Figure 8:
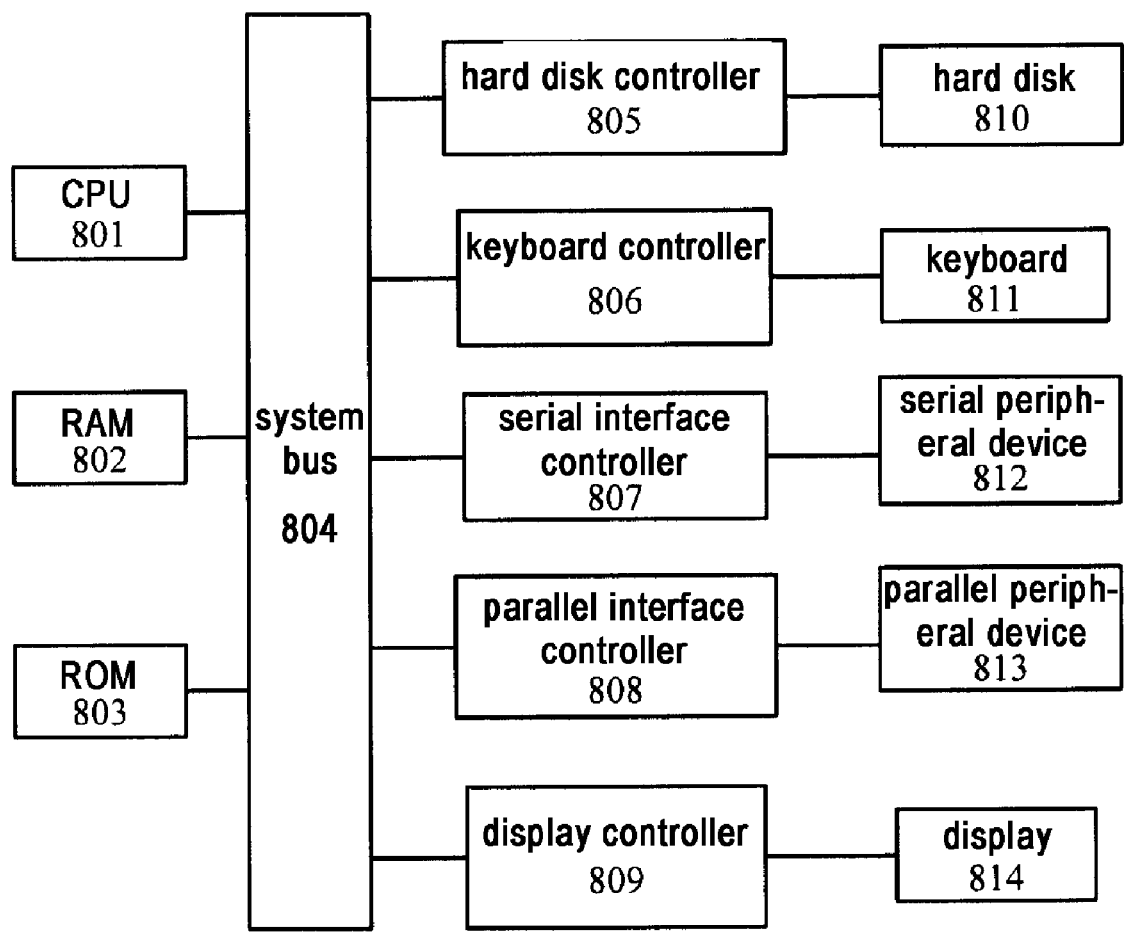
FIG. 8 schematically depicts a computer device in which embodiments according to the present invention can be implemented.

FIG. 8 schematically depicts a computer device in which the embodiments according to the present invention may be implemented.

The computer system depicted in FIG. 8 comprises a CPU (Central Processing Unit) 801, a RAM (Random Access Memory) 802, a ROM (Read Only Memory) 803, a system bus 804, a Hard Disk controller 805, a keyboard controller 806, a serial interface controller 807, a parallel interface controller 808, a display controller 809, a hard disk 810, a keyboard 811, a serial external device 812, a parallel external device 813 and a display 814. Among these components, connected to system bus 804 are CPU 801, RAM 802, ROM 803, HD controller 805, keyboard controller 806, serial interface controller 807, parallel interface controller 808 and display controller 809. Hard disk 810 is connected to HD controller 805, and keyboard 811 to keyboard controller 806, serial external device 812 to serial interface controller 807, parallel external device 813 to parallel interface controller 808, and display 814 to display controller 809.

The functions of each component in FIG. 8 are well known in the art, and the architecture depicted in FIG. 8 is conventional. Such architecture applies to not only personal computers but also hand held devices such as Palm PCs, PDAs (personal data assistants), mobile telephones, etc. In different applications, for example, for implementing a user terminal or a server host performing the method for creating the mappings according to the present invention, some components may be added to the architecture depicted in FIG. 8, or some of the components depicted in FIG. 8 may be omitted. The whole system depicted in FIG. 8 is controlled by computer readable instructions, which are usually stored as software in hard disk 810, EPROM or other non-volatile memory. The software can also be downloaded from the network (not depicted in the figure). The software, either stored in hard disk 810 or downloaded from the network, can be loaded into RAM 802, and executed by CPU 801 for implementing the functions defined by the software.

As the computer system depicted in FIG. 8 is able to support the solution of mapping multidimensional model to data warehouse schema according to the present invention, the computer system merely serves as an example of computer systems. Those having ordinary skill in the art may understand that many other computer system designs are also able to carry out the embodiments of the present invention.

The present invention may further be implemented as a computer program product used by, for example the computer system depicted in FIG. 8, which contains code for implementing the system for mapping multidimensional model to data warehouse schema according to the present invention. The codes may be stored in a memory of other computer system prior to the usage. For instance, the code may be stored in a hard disk or a removable memory like an optical disk or a floppy disk, or may be downloaded via the Internet or other computer network.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An information processing system for mapping a multidimensional model to a data warehouse schema, comprising:
   a memory;
   a processor communicatively coupled to the memory; and
   a system for a mapping multidimensional model to a data warehouse schema, the system being communicatively coupled to the memory and the processor, and wherein the system is configured to perform a method comprising:
      defining a multidimensional model based on a conceptual model represented by an ontology;
      receiving, from a user, a selection of an ontology path expression from the multidimensional model, wherein the ontology path expression comprises one or more basic ontology expressions and one or more composite ontology expressions;
      generating one or more simple mappings from one or more basic mappings by reasoning on the conceptual model so as to provide one or more mappings for concerning elements in an ontology path in the multidimensional model;
      generating a data structure capable of indicating information of the data warehouse schema by performing an analysis on the information of the data warehouse schema; and
      generating one or more result mappings according to the one or more mappings for the concerning elements of the ontology path in the multidimensional model and by searching in one or more data structure paths corresponding to the concerning elements of the ontology path in the multidimensional model, wherein generating the one or more result mappings comprises:
         obtaining one or more start nodes of the ontology path from the data structure;
         obtaining one or more end nodes corresponding to the one or more start nodes from the data structure;
         adjusting a weight of each edge of the data structure;
         identifying, in response to the adjusting, a maximally returned number of shortest paths in the data structure based on the one or more start nodes and one or more end nodes; and
         translating the maximally returned number of shortest paths into one or more mapping expressions.

2. The information processing system according to claim 1, wherein the system comprises:
   a user interface for supporting selection of the result mappings.

3. The information processing system according to claim 1, wherein the one or more basic mappings comprise mappings from each element in the conceptual model to the data warehouse schema, and wherein the one or more basic mappings are built in advance.

4. The information processing system according to claim 1, wherein the one or more simple mappings are generated based at least on the following reasoning rules:
   a class inherits all mappings of its subclasses; and
   a property inherits all mappings of its sub-properties.

5. The information processing system according to claim 1, wherein the data structure is a functional dependency graph.

6. The information processing system according to claim 5, wherein the functional dependency graph is a weighted and directed graph, and weights of the respective edges in the directed graph are adjustable, and wherein the one or more result mappings are ranked according to current weights in the functional dependency graph so as to be selected by the user.

7. The information processing system according to claim 6, wherein one or more the result mappings are ranked according to the following expression:

$$\text{Rank}(p) = \text{weight}(p) + \alpha \times (1 - |S_m \cap S_p| / |S_m|), \ 0 < \alpha < 1$$

wherein p is the obtained shortest path, $S_m$ is the set of nodes in the functional dependency graph corresponding to a class and properties other than a start class (C1) and end property, and $S_p$ is a set of the nodes which a path p covers.

8. A method for mapping a multidimensional model to data warehouse schema, comprising:
   defining a multidimensional model based on a conceptual model represented by an ontology;
   receiving, from a user, a selection of an ontology path expression from the multidimensional model, wherein the ontology path expression comprises one or more basic ontology expressions and one or more composite ontology expressions;
   generating one or more simple mappings from one or more basic mappings by reasoning on the conceptual model so as to provide one or more mappings for concerning elements in an ontology path in the multidimensional model;
   generating a data structure capable of indicating information of the data warehouse schema by performing an analysis on the information of the data warehouse schema; and
   generating one or more result mappings according to the one or more mappings for the concerning elements of the ontology path in the multidimensional model and by searching in one or more data structure paths corresponding to the concerning elements of the ontology path in the multidimensional model, wherein generating the one or more result mappings comprises:
      obtaining one or more start nodes of the ontology path from the data structure;
      obtaining one or more end nodes corresponding to the one or more start nodes from the data structure;
      adjusting a weight of each edge of the data structure;
      identifying, in response to the adjusting, a maximally returned number of shortest paths in the data structure based on the one or more start nodes and one or more end nodes; and
      translating the maximally returned number of shortest paths into one or more mapping expressions.

9. The method according to claim 8, further comprising:
   selecting the result mappings.

10. The method according to claim 8, wherein the one or more basic mappings comprise mappings from each element in the conceptual model to the data warehouse schema, and wherein the one or more basic mappings are built in advance.

11. The method according to claim 8, wherein reasoning rules employed in the step of generating more simple mappings from the basic mapping comprise:
   a class inherits all mappings of its subclasses; and
   a property inherits all mappings of its sub-properties.

12. The method according to claim 8, wherein the data structure is a functional dependency graph.

13. The method according to claim 12, wherein the functional dependency graph is a weighted and directed graph, and weights of the respective edges in the directed graph are adjustable, and wherein the method further comprises:

ranking the one or more result mappings according to current weights in the functional dependency graph so as to be selected by the user.

14. The method according to claim 13, wherein the one or more result mappings are ranked according to the following expression:

$$Rank(p) = weight(p) + \alpha \times (1 - |S_m \cap S_p|/|S_m|), \ 0 < \alpha < 1$$

wherein p is the obtained shortest path, $S_m$ is the set of nodes in the functional dependency graph corresponding to a class and properties other than a start class (C1) and end property, and $S_p$ is a set of the nodes which a path p covers.

* * * * *